UnitedStatesPatentOffice 3,846,236
Patented Nov. 5, 1974

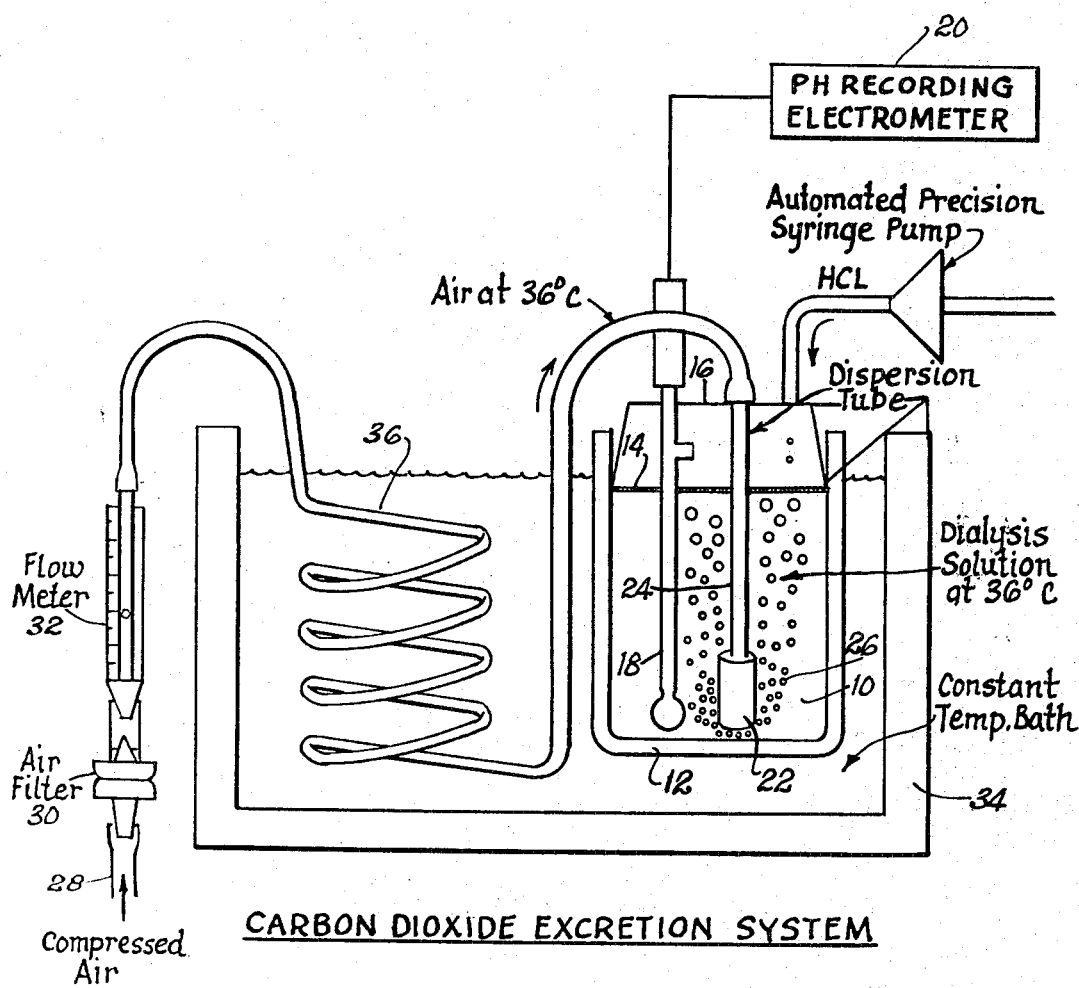

3,846,236
METHOD AND APPARATUS FOR DIALYSIS
Stuart J. Updike, Madison, Wis., assignor to Wisconsin Alumni Research Foundation, Madison, Wis.
Filed Oct. 22, 1971, Ser. No. 191,720
Int. Cl. A61n 1/03
U.S. Cl. 195—1.8
10 Claims

ABSTRACT OF THE DISCLOSURE

Rapid respiratory gas exchange across a dialysis membrane is achieved from water solution of hydrogen peroxide and a dialysis membrane embodying a catalyst for conversion of hydrogen peroxide to oxygen and water and in which bicarbonate ion diffuses in the opposite direction through the membrane into the electrolyte for removal by bubbling air therethrough.

---

The invention described herein was made in the course of work under a grant or award from the Department of Health, Education, and Welfare.

This invention relates to gas exchange across a dialysis membrane for the transmission of oxygen and/or bicarbonate ion through the membrane for delivery of oxygen to a fluid on one side of the membrane or the removal of carbon dioxide from the fluid, or for simultaneous delivery of oxygen and removal of carbon dioxide from the same fluid, and the invention relates particularly to a method and means of the type described for respiratory gas exchange with blood or blood plasma as the fluid to receive oxygen and/or give up carbon dioxide.

The invention will be described with reference to respiratory gas exchange but it will be understood that the concepts of this invention will have application to other uses for introduction of oxygen into a fluid and/or for the removal of carbon dioxide from a fluid, in chemical reactions and the like.

Respiratory gas exchange across a dialysis membrane was evaluated in the 1950's by investigators who were searching for a membrane suitable for developing an artificial lung. However, diffusivity of oxygen across this type of membrane was so poor that it was discarded as unsuitable for clinical oxygenation purposes.

Dialysis membranes of the type used in the artificial kidney were evaluated as potential respiratory gas exchange membranes by Firme, J. of Thor. and Cardiovasc. Surg. 40, 253 (1960), with disappointing results. He obtained a diffusivity of only 5.4 ml. of oxygen per minute per square meter at approximately 690 mm. of mercury of oxygen tension. Typically an artificial kidney has about one square meter of dialysis membrane. Therefore, delivery of basal oxygen requirement, which is about 250 ml. of $O_2$ per minute for a 70 kilogram man, across an artificial kidney membrane, would require about a 50-fold increase in the dialysis membrane area. This is not practical from an engineering or clinical point of view. Oxygen is relatively water insoluble, and therefore should be expected to have poor diffusivity across a hydrated cellulose membrane. Similarly, carbon dioxide, like oxygen, is also poorly water soluble, and therefore has poor diffusivity across a dialysis membrane.

It is an object of this invention to provide a method and means for rapid transport of oxygen and/or bicarbonate ion across a dialysis membrane and to provide a means and method for regulating the rate of transfer of these substances for use as a respiratory support system for conveying oxygen to the blood, and/or for the removal of carbon dioxide thereby to give the effect of an artificial lung or an artificial heart, or preferably to provide the effect of both these organs simultaneously in treatment of blood.

Referring first to the utilization of the concept of this invention as an oxygenator, the rate of gas transmission is insufficient when the oxygen is made available on the opposite side of the membrane in gaseous form, even when 100% oxygen at one atmosphere tension or higher is employed. On the other hand, assuming complete supersaturation of $O_2$ released by catalysis, the oxygen tension available from a ½% solution of $H_2O_2$ is equivalent to about 74 atmospheres of oxygen at 36° C., or about 74 times the concentration available from gaseous systems at atmospheric pressure. Perfect supersaturation of $O_2$ does not occur, but sufficient supersaturation occurs to produce $O_2$ tensions as measured by a Clark $O_2$ electrode as high as 12 atmospheres. Diffusion flow measurements of $H_2O_2$ through two types of untreated artificial kidney dialysis membranes of hydrated cellophane are given in Table I. The values were obtained with distilled water on one side of the membrane and a 0.5% solution of $H_2O_2$ in water on the opposite side of the membrane, with all membranes mounted vertically between two polypropylene diffusion chambers of the same geometry. Thus one of the important concepts of this invention is in the utilization of dilute solutions of $H_2O_2$ as a chemical source of oxygen for delivery by diffusion through dialysis membranes.

The difficulty with the use of dilute aqueous solutions of hydrogen peroxide for transmission through the dialysis membrane for introduction into the blood plasma is that the enzyme catalase, which is present in the blood, is able rapidly to convert the $H_2O_2$ into oxygen and water, with the release of oxygen at such rapid rate as to present the possibility of gas embolism toxicity. Furthermore, $H_2O_2$ is known to cause oxidation of hemaglobin to methemaglobin which is inactive as an oxygen carrier. Thus, while it is desirable to make use of dilute $H_2O_2$ as a source for oxygen, it is equally desirable to effect conversion of the $H_2O_2$ to oxygen before the $H_2O_2$ reaches the blood stream.

This has been accomplished, in accordance with an important feature of this invention, by the use of a dialysis membrane which is wettable by the aqueous solution of $H_2O_2$ and which is fabricated to embody a catalyst which converts $H_2O_2$ into oxygen and water during passage of the $H_2O_2$ through the membrane, whereby molecular or nascent oxygen is made available on the opposite surface of the membrane in contact with the blood plasma, as illustrated by the following example.

EXAMPLE 1

Preparation of dialysis oxygenator membrane:

An untreated cellophane membrane, of the type previously described as being used in artificial kidney dialysis, is first hydrated in water and then simultaneously exposed on one side to a 0.3 molar potassium permanganate solution and, on the opposite side, to a 0.1 molar sodium iodide solution for about one minute. Diffusion of the two solutions from opposite sides into the membrane caused the precipitation of manganese dioxide in the interior of the dialysis membrane, as by iodide reduction of the permanganate. This gave the membrane a homogeneous, translucent, amber pigmentation.

After the $MnO_2$ catalyst was entrapped in the membrane, diffusion flow of $H_2O_2$ through the membrane was no longer detectable by permanganate titration. Complete catalytic breakdown of $H_2O_2$ during membrane transport was indicated by the production of bubbles of oxygen on both sides of the membrane. Two micromoles of $H_2O_2$, undergoing complete transmembrane catalysis, produces one micromole or 22.4 microliters of oxygen at standard temperature and pressure, in accordance with the following equation:

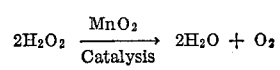

The rate of oxygen formation was estimated volumetrically by collecting the bubbles that form and is given in Table I for the treated membrane with only the values of oxygen produced on the distilled water side of the membrane being given in the table. The membrane produced in accordance with Example 1 was functionally symmetrical, that is, the membrane could be reversed in the diffusion apparatus and the same experiments repeated with substantially the same results.

Asymmetrical membranes can be produced and employed if the sodium iodide concentration is increased during the $MnO_2$ entrapment process. If a 0.5% $H_2O_2$ solution is placed simultaneously in contact with both sides of such asymmetrical membrane, then the side treated with the potassium permanganate will have increased oxygen production by comparison with the side treated with sodium iodide. Similarly, unidirectional $H_2O_2$ transport for greater release of oxygen from the permanganate sides can be achieved. For example, if, in the foregoing example, the sodium iodide concentration is increased 10-fold, then rate of oxygen productivity from the permanganate side will be twice as great as from the iodide side.

Thus it is possible to localize the catalyst more on one side of the membrane than the other. Oxygen production on the side of the membrane contacted by $H_2O_2$ does not contribute to oxygen transport. As a result, in the preferred practice of this invention, it is preferable to entrap the catalyst in the portion of the membrane adjacent to the side where oxygen is released.

Both symmetrical and asymmetrical membranes can be made to produce oxygen at a rate close that predicted from the pretreatment $H_2O_2$ transport data. For example, in Table I, for the membrane identified as Ex-01, 47.5 microliters of $O_2$ was produced per square centimeter per minute at 25° C. By calculation according to the previous equation, this is equivalent to 3.74 micromoles of $H_2O_2$. This is in good agreement with 3.68 micromoles obtained experimentally for $H_2O_2$ transport through untreated membrane.

The diffusion of sodium ion, across the dialysis membranes, was measured by flame photometry before and after entrapment of $MnO_2$. Only about 10% decrease was observed after membrane treatment, as shown in Table I. This suggests that treatment to introduce $MnO_2$ has not materially altered the dialysis properties of the membrane.

In practice, use can be made of two concentric tubes with the outer tube formed of glass or of rubber tubing while the inner tube is formed of the catalyst containing semi-permeable membrane, such as hydrated cellophane. The blood was bypassed for flow through the inner tube while the $H_2O_2$ in water solution was caused to flow through the narrow annular passage between the inner tubing and the outer tubing, in cocurrent or in countercurrent flow. The amount of $H_2O_2$ in solution in water can be varied within the range of 0.1 to 50% by weight but, for normal use as a blood oxygenator, it is preferred to make use of a solution within the range of 0.25 to 1% by weight $H_2O_2$.

Instead of making use of sodium iodide for precipitation of $MnO_2$ from the permanganate, other alkali metal iodides or similar reducing agents can be employed. Similarly, other water soluble permanganates, such as sodium permanganate, ammonium permanganate, and the like can be used instead of potassium permaganate. For good diffusion at a uniform rate, it is desirable to make use of a dialysis membrane, in the form of a semi-permeable membrane formed of materials that are wet by the fluids disposed on both sides of the membrane. Thus, for use of $H_2O_2$ in aqueous solutin on one side and blood plasma on the other, it is preferred to make use of a membrane of hydrophilic material for ready wet-out and absorption of the aqueous medium.

For this purpose, use can be made of semi-permeable membrane formed of a water insoluble, water wettable cellulose derivative, such as cellophane, cellulose acetate, cellulose propionate, carboxyethyl cellulose and the like, insolubilized gelatin, partially hydrolyzed polyvinl acetate and the like, and polyionic film forming compositions such as the polysulfonated anionic polymers or ionically linked polycationic polymers, as are marketed by Amicon Company. Dialysis membranes in the form of multiple hollow fibers as are now available from the Dow Chemical Company can also be used.

Hydrophobic membranes, preferably formed of silicone rubers, can also be used as the semi-permeable dialysis membrane.

Instead of manganese dioxide, use can made of other catalytic agents known to convert $H_2O_2$ to oxygen and water. Representative of such other catalytic agents which may be employed are silver particles, such as colloidal silver and the like formed in situ in the membrane, as by wetting one side of the membrane with a silver nitrate solution while the other side is wet with an alkaline zinc solution for reaction to precipitate silver in fine particle form in the membrane. Similarly, one side of the membrane can be wet with a silver halide solution while the opposite side is wet wit ha photographic type reducing agent, such as a hyposulfite, for reaction in the interior of the membrane to precipitate silver particles which catalyze the reaction to convert $H_2O_2$ to oxygen and water during transport therethrough. Colloidal and chelated iron and the more noble metals platinum and gold can also be used. The enzyme catalase, iron-albumin mixtures, hemin, colloidal cholesterol and some organic compounds of nonbiologic origin, such as phthalocyamines, are potential transmembrane catalysts of $H_2O_2$.

Catalysts for conversion of $H_2O_2$ to oxygen are well known to include such metals as platinum, silver and gold, from which suitable porous membranes can be formed. Porous metal membranes can be constructed by pressure and/or heat sintering of the materials, or by a photographic etching technique, and are available commercially at a thickness of 3 microns and at a pore size of 0.2 micron. These membranes can then used to support a cellulose or silicone rubber film polymerized over the surface of the metal.

Ideally, the rate of oxygen transfer should be controlled for delivery of enough oxygen to saturate the hemaglobin binding sites of the blood. Delivery in amounts in excess may result in bubble embolism. As a result, from the standpoint of efficient and safe operation, it is desirable to provide for delivery of less oxygen than is required to effect saturation of the blood binding sites.

The rate of oxygen delivery can be easily controlled as by (1) variation in the thickness of the dialysis membrane, in which the rate of delivery decreases with increased thickness of the membrane; (2) adjustment in the degree and character of the porosity of the semi-permeable membrane and the composition thereof; and, more effectively, (3) by adjustment of the concentration of the $H_2O_2$ solution, with the rate of oxygen delivery increasing with increased concentration of $H_2O_2$ and vice versa.

It will be apparent that proper selection of concentration, thickness and porosity of the membrane can readily be made by the skilled in the art, depending upon the rate of consumption of oxygen desired.

With reference now to the removal of $CO_2$ from blood plasma, to evaluate the capacity of the artificial kidney to excrete $CO_2$, the drop in total plasma $CO_2$ concentration was measured in the artificial kidney during routine extracorporeal hemodialysis. The dialysis bath recipe contained no bicarbonate ion but instead was made 36 milliequivalents per liter with respect to acetate ion. The percent drop in plasma total $CO_2$ was $51 \pm 4$ S.E.M., as measured in randomly selected patients.

A hypothetical 70 kilogram man excretes about 10 millimoles of $CO_2$ per minute. Typically, plasma bicarbonate levels and extracorporeal blood flow are 20 to 24 milliequivalents per liter and 200 to 300 ml. per minute, respectively, for patients undergoing routine hemodialysis. Patients with pulmonary insufficiency frequently have plasma bicarbonate levels 50 milliequivalents per liter or higher. Using vein to vein hemodialysis, extracorporeal flow rates of 500 ml. per minute or higher can be obtained. Assuming 50% extraction of $CO_2$, a plasma bicarbonate of 40 milliequivalents per liter and an extracorporeal blood flow rate of 500 ml. per minute, then as a first approximation, 10 millimoles per minute of $CO_2$ would be excreted into the dialysis bath.

To the present, such dialysis electrolytes have been formulated with a bicarbonate ($HCO_3^-$) concentration which roughly is equivalent to the concentration of $HCO_3^-$ in the blood plasma so as not to alter the blood plasma. To prevent the dialysis bath from becoming alkaline from loss of $CO_2$ to the air, $CO_2$ was bubbled through the dialysis solution.

Though this procedure prevents the precipitation of calcium hydroxides, it is undesirable since it requires the presence of a large tank of $CO_2$ and a dispersion system. Instead, use has been made of acetate anion instead of bicarbonate in the electrolyte in order to obtain the desired control.

An important concept of this invention resides in the removal of $CO_2$ from blood plasma but not as $CO_2$ gas as is conventionally done in an artificial lung, but as bicarbonate which diffuses into the dialysis bath.

Most blood $CO_2$ is present in the form of bicarbonate, which can readily diffuse across a dialysis membrane. Once in the dialysis bath or electrolyte, the bicarbonate ion can react with hydrogen ion to form carbonic acid ($H_2CO_3$). In accordance with the practice of this invention, the carbonic acid that is formed in the dialysis bath is efficiently and continuously removed by bubbling air through the dialysis bath. Thus the bicarbonate ion will transfer in the reverse direction from the blood plasma through the dialysis membrane into the dialysis bath. Once in the dialysis bath, the bicarbonate ion combines with hydrogen ion to form carbonic acid which is continuously removed from the bath by bubbling air through the bath to reduce the carbonic acid to water and carbon dioxide in accordance with the equation $$H_2CO_3 \rightarrow H_2O + CO_2$$

The carbon dioxide is continuously carried off with the air to make the bath receptive for the transport of additional bicarbonate from the blood plasma.

This feature of continuous removal of carbon dioxide from the bath for continuous transfer of bicarbonate from blood plasma by diffusion through the dialysis membrane will be illustrated by the following example carried out on a laboratory scale.

EXAMPLE 2

Air bubbled through a dialysis bath solution that was 36 milliequivalents per liter with respect to bicarbonate ion, removed 1.7 millimoles of $CO_2$ per liter of bath solution per minute at 36° C. With reference to the accompanying drawing, the air was first passed through a dispersion tube and then the dialysis bath solution. The initial rate of $CO_2$ removal was determined by acid titration sufficient to keep the pH at about 7.4. By way of confirmation, $CO_2$ removal was also determined by the microgasometric method of Copp and Natelson. The two methods were in good agreement. A $CO_2$ excretion based upon this principle would require a dialysis bath having a volume of 6 liters to excrete the 10 millimoles of $CO_2$ produced per minute by a hypothetical 70 kilogram man at rest. Since most dialysis baths used clinically are much larger than 6 liters, $CO_2$ removal based on this principle is easy to achieve.

Air bubbled through the bath lowers the concentration of carbonic acid by removing carbon dioxide, and thus reduces the acidity of the bath. As a result, it is possible completely to control the bath by constant monitoring with a pH meter. If the bath tends to shift towards the alkaline side, the rate of introduction of air should be reduced and, in the event of increase in acidity, the amount of air bubbled through the bath should be increased.

In this manner, the carbon dioxide is carried out of the bath in proportion to the amount of bicarbonate drained from the blood plasma through the dialysis membrane. Thus the process for $CO_2$ removal from blood is capable of substantially continuous operation without change.

In the use of the dialysis membrane for the transport of bicarbonate ion from the blood plasma to the electrolyte, the dialysis membrane need not be constructed with a catalytic agent since no catalytic effect is relied upon for modification of the material diffused through the semi-permeable membrane. Thus any of the conventional dialysis membranes or hollow fiber kidneys can be employed for this purpose, with preference being given to the water insoluble, water wettable membranes of the type heretofore described.

As previously pointed out, an important and novel concept of this invention resides in the combination of the two concepts heretofore described wherein a single dialysis membrane having a catalyst of the type described can be used to effect both operations simultaneously, that is, the use of a dilute aqueous solution of $H_2O_2$ in the electrolyte and through which air is bubbled to achieve the dual effect of diffusion of $H_2O_2$ into the membrane for conversion to water and oxygen made available on the opposite side to the blood or plasma at a controlled rate, and for the simultaneous transmission through the dialysis membrane of the bicarbonate ion from the blood plasma to the dialysis solution, through which air is bubbled to effect carbonic acid formation and removal of $CO_2$ as it is formed.

At the low concentration of $H_2O_2$ in the aqueous electrolyte, the amount of $H_2O_2$ that might be lost by volatilization with the air bubbling through the bath will be insignificant such that a single dialysis bath can be used to function simultaneously as an oxygenator for the blood and as an artificial lung for removal of $CO_2$ from blood plasma in exchange for the oxygen.

Use can be made of a dialysis membrane containing the catalytic agent required for conversion of the $H_2O_2$ to oxygen and water without interfering with the transmission of bicarbonate ion in the reverse direction through the membrane. The bath can still be monitored by the pH meter for control of the air flow rate through the bath.

Referring now to the drawing for a diagrammatic illustration of the apparatus which may be used in the practice of this invention, the bath 10 of a 0.5% solution of $H_2O_2$ in water is housed within a chamber 12 having for one of its walls 14 a hydrated dialysis membrane of cellophane having $MnO_2$ (or other $H_2O_2$ catalyst) embodied therein, as by the procedure described in Example 1. Blood plasma is bypassed from the human system through the enclosed chamber 16 on the opposite side of the membrane 14. The bath 10 is provided with a tube 18 of a pH recorder 20. An air diffuser 22 extends from a tubing 24 to the lower portion of the bath for diffusing bubbles of air 26 supplied from a compressed air source 28 through an air filter 30 and a flow regulator 32 for controlling the flow rate, as controlled by the pH controller 20.

The bath 10 is housed within a casing 34 through which heat exchange liquid is circulated for controlling the temperature of the bath and adjusting the air temperature to approximately the temperature of the bath as the air flows through heat exchange coils 36 immersed in the heat exchange fluid.

Thus, the removal of volatile acid ($H_2CO_3$) can be automatically adjusted to keep the pH of the dialysis bath in the proper physiological range. Similarly, the rate at which $H_2O_2$ is interfused into the dialysis bath can be regulated as a function of the oxygen tension of the blood, as measured continuously as it leaves the dialysis system.

It will be apparent that the oxygenator, which is described by reference to making oxygen available on the surface of the membrane to be taken up by the bypassed blood, will have application for other uses where pure or nascent oxygen is required at low cost and for delivery at a uniform rate over a wide surface area, such as in aerobic fermentation, an oxygen tent and the like.

It will be equally obvious that an oxygenator of the type described can make oxygen available in the nascent state and/or at multi-atmospheric pressures without hyperberic configuration.

It will be understood that changes may be made in the details of construction, arrangement and operation, without departing from the spirit of the invention, especially as defined in the following claims.

TABLE I.—DIALYSIS MEMBRANE TRANSPORT AND CATALYSIS

| Membrane | $H_2O_2$ transport, micromoles/ cm.$^2$×min. | $O_2$ production, microliters/ cm.$^2$×min. | $Na^+$ transport, microequivalents/ cm.$^2$×min. |
|---|---|---|---|
| Ultraflo 145:[1] | | | |
| Untreated | 2.75±0.04 | None | 17.4±0.3 |
| Catalyst entrapped | None | 26.4±0.1 | 15.4±0.2 |
| EX-01:[2] | | | |
| Untreated | 3.68±0.07 | None | 26.4±0.2 |
| Catalyst entrapped | None | 45.7±0.1 | 24.2±0.2 |

[1] Thickness 25 microns, total surface area 1.5 square meters, Travenol Lab. Inc.
[2] Thickness 18 microns, total surface area 0.7 square meter, Extrocorporeal Med. Spec. Inc.

NOTE.—Measurements were made at room temperature.

I claim:

1. The method of oxygenation of a liquid by dialysis with a liquid containing hydrogen peroxide comprising the steps of separating the liquid to be oxygenated from the hydrogen peroxide solution with a semi-permeable membrane which is wettable by the liquids and which embodies a catalytic agent which converts $H_2O_2$ to $H_2O$ and $O_2$ during passage of the $H_2O_2$ therethrough, whereby oxygen is released at the surface of the membrane in contact with the liquid to be oxygenated.

2. The method as claimed in Claim 1 in which the liquid to be oxygenated is blood bypassed from the human system into contact with one wall of the semi-permeable membrane.

3. The method as claimed in Claim 1 in which the catalyst is manganese dioxide.

4. The method as claimed in Claim 1 in which the catalyst is silver particles.

5. The method as claimed in Claim 1 in which the $H_2O_2$ is in solution in water.

6. The method as claimed in Claim 1 in which the semi-permeable membrane is a hydrophilic cellulosic derivative.

7. The method as claimed in Claim 6 in which the semi-permeable membrane is a hydrated cellophane.

8. The method as claimed in Claim 1 in which the semi-permeable membrane and catalyst are together a metal selected from the group consisting of platinum, silver, and gold.

9. The method as claimed in Claim 8 which includes a surface coating of a silicone rubber on the metal film.

10. The method as claimed in Claim 8 which includes a surface coating of a hydrophilic cellulosic derivative on the metal film.

References Cited
UNITED STATES PATENTS 3,526,481   9/1970   Rubricious _____ 23—258.5

RICHARD L. HUFF, Primary Examiner

U.S. Cl. X.R.

23—258.5